Jan. 7, 1958 R. C. PALMER 2,819,017

RECIPROCAL ANALOG ELECTRICAL CIRCUIT

Filed Aug. 7, 1952

INVENTOR.
RICHARD C. PALMER

BY Darby & Darby
ATTORNEYS

United States Patent Office 2,819,017

Patented Jan. 7, 1958

2,819,017

RECIPROCAL ANALOG ELECTRICAL CIRCUIT

Richard C. Palmer, Pompton Plains, N. J., assignor to Allen B. Du Mont Laboratories, Inc., Clifton, N. J., a corporation of Delaware Application August 7, 1952, Serial No. 303,050

3 Claims. (Cl. 235—61)

This invention relates to electrical analogue circuits and particularly to circuits for performing the electrical operation analogous to the mathematical operation of division.

In many situations it is desirable to perform electrically the operation of division or taking ratio; that is, to produce an output electrical signal representative of the ratio of two input electrical signals. Such systems are very useful in various types of electrical computers or electrical control systems, such as color television and radar ranging systems.

The mathematical process of dividing one function by another may be carried out directly or by inverting the divisor function and multiplying it by the dividend function. The electrical circuit of this invention operates according to the latter process by inverting or taking the reciprocal of an electrical signal corresponding to the divisor function. This is done according to the present invention by frequency modulating a carrier wave with the divisor function signal, passing the resultant frequency modulated wave through a circuit having a response characteristic which is an inverse function of frequency, amplitude demodulating or detecting the output signal from the inverting circuit to provide the reciprocal signal, and multiplying the output reciprocal signal by a second electrical signal corresponding to the dividend function.

The principal object of the present invention is therefore to provide an improved electrical circuit for effecting division or for inverting a signal to form its reciprocal, and particularly by the use of simple, well-understood and conventional sub-circuits coupled in special combination to effect the desired results.

Other objects will be apparent after studying the following description together with the appended drawings in which.

The problem and the nature of its solution will be best understood from consideration of a simplified example. In general, if it is desired to divide any function by some other function $f(x)$ of the same variable $x$, the resulting division or ratio can be obtained by deriving the reciprocal $$\frac{1}{f(x)}$$

of the divisor function $f(x)$ and multiplying that reciprocal by the other function to obtain the ratio desired.

Figures 1, 2:
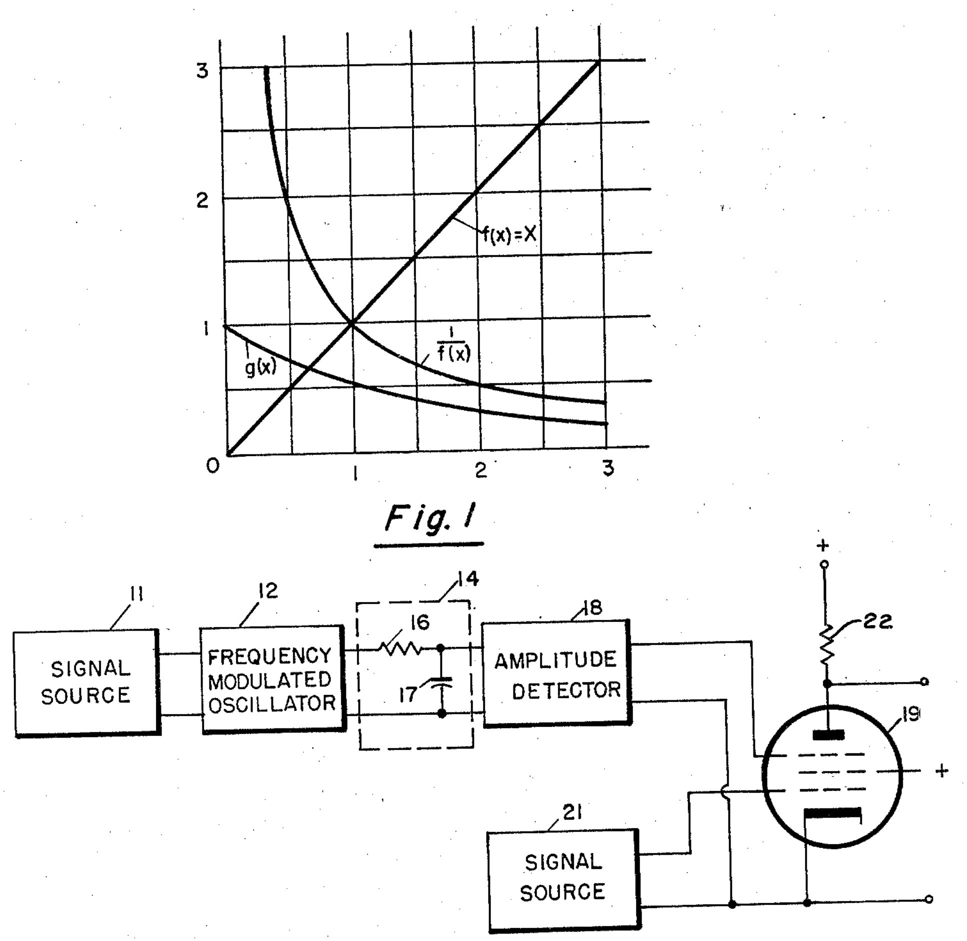
Figure 1 is a graphical illustration of mathematical functions useful in explaining the invention.
Figure 2 shows, in block diagram form, one electrical circuit according to the invention.

By way of example, suppose $f(x)=x$. This curve is illustrated in Figure 1, in which $x$ is a variable continuous from zero to positive infinity and $f(x)$ is therefore a function also continuous over the same interval. The reciprocal of this function, namely $$\frac{1}{f(x)}$$

is also plotted in Figure 1, and will be seen to be a hyperbolic curve.

Figure 2 shows in block diagram form a circuit which produces the reciprocal function $$\frac{1}{f(x)}$$

In Figure 2, a signal source 11 generates an electrical signal which is a continuous, single-valued function of time, representing the divisor for the division problem. This source 11 may have any form the nature of the problem requires, and may, for example, be a manually or automatically positioned resistor, potentiometer, variometer, selsyn, or other circuit producing a direct or alternating signal to be divided into another signal. This divisor signal from source 11 is supplied to a frequency modulated oscillator 12 of any conventional type adapted to generate a carrier wave and to frequency modulate that carrier wave by the input division signal. One form which modulated oscillator may take is that of an oscillator having a reactance tube as a frequency determining element. Amplitude limiters may be included where desired. The modulated oscillator 12 then produces an electrical signal of uniform amplitude having a frequency which varies proportionately with the amplitude of the divisor signal from the source 11. This frequency modulated signal is impressed on a frequency selective circuit 14 which has the characteristic of passing lower frequencies with greater amplitude than higher frequencies, and preferably provides an output signal varying in amplitude in inverse proportion to the frequency of its input signal. This circuit 14 may assume many different forms, comprising in this instance a resistor 16 in series with a capacitor 17, and an output signal is derived from across the capacitor 17.

As is evident, resistor 16 and capacitor 17 form essentially a voltage dividing circuit. The impedance of resistor 16 is constant despite change in frequency, while that of capacitor 17 varies inversely with frequency. The output is proportional to the ratio of the capacitor impedance to the total impedance and, as will be shown below, is substantially an inverse reciprocal function of frequency.

The output signal from the selector circuit 14 is then supplied to an amplitude detector 18, whose output is proportional to the envelope or amplitude of the input thereto. This detector may be of any conventional type, such as a diode or triode detector.

It is necessary that the final output signal from detector 18 represent a faithful analogue of the mathematical reciprocal of the divisor signal function produced in source 11, although it is not required that each of the stages in obtaining the output signal be performed linearly. A limitation which inheres in an attempt to employ only circuit elements having linear transfer characteristics may be examined by considering the transfer characteristic of the simple R-C network comprising the frequency selective circuit 14. Resistor 16 and condenser 17 operate as a voltage dividing network. The output voltage $E_0$ bears the following relation to the input voltage $E_1$:

$$E_o=E_i\sqrt{\frac{1}{(\omega RC)^2+1}}$$

in which the radical is the transfer characteristic.

It will be noted that the expression in brackets is a function of the angular velocity $\omega$ and that, except for the term "1" in the denominator, it is a linear inverse function of $\omega$. Due to the term "1" in the denominator, however, it is not truly a linear inverse function. Thus, it is not possible to obtain a condition analogous to the reciprocal of numbers less than 1, since $(\omega RC)^2$ can never be negative, and the entire radical is always less than unity. This transfer characteristic $g(x)$ is plotted in Figure 1, in which $\omega$RC has been replaced by $x$. It can be seen in the figure that the function $g(x)$ has a maximum of 1 at $\omega=x=0$ (the abscissa being calibrated in terms of angular velocity $\omega$) and decreases asymptotically to zero with increasing $\omega$. To make the function $g(x)$ substantially identical with the form $$\frac{1}{f(x)}$$

it is desirable to give $x$ a very high value so that 1 will, in comparison, be negligible. This requires high R, high C, or high $\omega$. There are practical limits to the magnitude of the values of resistor 16 and condenser 17; reasonable values might be one megohm for resistor 16 and one microfarad for condenser 17. These values, when multiplied by each other, result in a product of one, so that it is desirable that $\omega$ have a value of the order of at least 1000 radians per second, to cause the term 1 in the denominator to be negligible as a practical matter in comparison with $\omega$RC.

It may be seen, from observation of the curve of $g(x)$ Figure 1, that making $\omega$RC very large is equivalent to going far to the right in the graph to a region where the output signal given in the expression above would be a very small percentage of the input signal. This small output signal, may, of course, be raised by means of amplifiers connected in series with the detector 18.

Another way to increase the output is to have the overall frequency swing of modulated oscillator 12 be large for a given input signal variation range. The wider the range of swing of the oscillator output, the greater the resultant output of the circuit. Thus, if a given variation of divisor function signal gave a 2 to 1 variation in oscillator frequency, a predetermined variation in reciprocal signal would be attained. If the oscillator swing were 4 to 1, the reciprocal signal variation would be further increased. For maximum effectiveness, the oscillator frequency swing should be nearly of the same order of magnitude as the center oscillator frequency, requiring a large deviation ratio.

The inverted output signal from the detector 18 may be used as it is, or it may be applied to a multiplying circuit 19 such as a variable-mu tube. The connection of the amplitude demodulator 18 is made to the 3rd grid of the tube 19. It is well known that the operation of a variable-mu tube when excited by two signals such as from detector 18 and source 21 is analogous to the mathematical process of multiplying the function represented by one of these signals by the function represented by the other signal, so that the output signal which is generated across the plate load 22 of tube 19 is effectively the product of these two signals.

Figure 3:
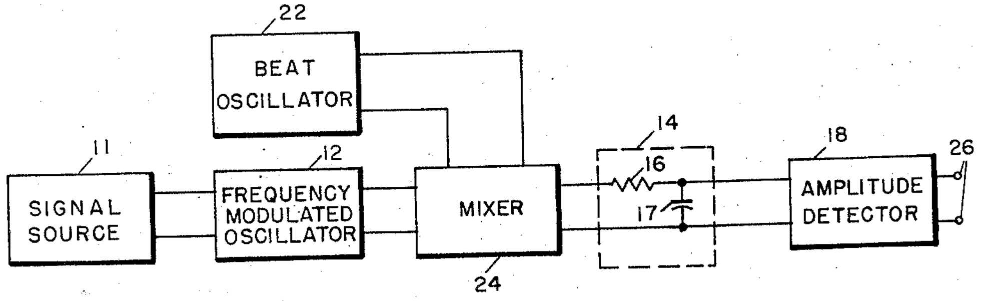
Figure 3 is a similar circuit representing modification of part of Figure 2.

A different arrangement for obtaining a large deviation ratio is shown in Figure 3, in which elements corresponding to elements in Figure 2 have the same numbers. In the circuit of Figure 3, the frequency modulator 12 may deviate the frequency of oscillator 12 by only a small percentage of its center frequency. A beat oscillator 22 operating at a frequency only slightly separated from the frequency of oscillator 12 may be heterodyned with the signal from modulator 12 in a mixer 24, resulting in an output signal which has a large percentage deviation. The circuit in Figure 3 provides only a reciprocal of the divisor function signal from source 11 at the output terminals 26. If the ratio of two signals is required, the multiplying circuit 19 and dividend signal source 21 may be connected as in Figure 2 to the detector 18.

The oscillator 12 has thus far been described as though it were a constant voltage source; it may, however, be a constant current source, that is, one having a high output impedance. In such case, resistor 16 may be omitted, and the frequency selective network 14 reduces to the condenser 17 in parallel with the output of the constant current source.

No output amplitude limiters have been shown for the oscillator 12 in Figures 2 and 3, since it is well known to provide such circuits in connection with frequency modulated oscillators. If it is desired to perform each of the steps of obtaining the reciprocal signal as linearly as possible, such an amplitude limiter will be required for oscillator 12 unless the oscillations are self-limited.

While the invention has been illustrated for the function $f(x)=x$, it will be understood that any continuous finite divisor function signal may be utilized.

Although the method and apparatus have been described in relation to a particular embodiment of the invention, it will be apparent to those skilled in the art that modifications may be made without departing from the scope of the invention as defined by the following claims.

What is claimed is:

1. An electrical dividing circuit comprising a source of electrical divisor signal; a frequency modulated oscillator connected to said source to have the frequency of oscillations modulated by said divisor signal; a frequency selective circuit connected to said oscillator to be energized thereby, said frequency selective circuit having a transfer characteristic which is an inverse function of frequency; an amplitude detector connected to said selective circuit to be energized thereby; a source of dividend signal; and a multiplying circuit connected to said last named source and to said amplitude detector to multiply the output signals therefrom.

2. An electrical circuit for performing division, comprising: a multi-grid electron tube; a source of signals which are representative of the divisor; means for producing a signal which is a reciprocal of said divisor signal, said reciprocal signal producing means comprising means for transforming said divisor signal into a corresponding signal having varying frequency components, and means for transforming said frequency components into a corresponding amplitude modulated signal; means for applying said reciprocal signal to a grid of said tube; a source of signal which is representative of the dividend; and means for applying said dividend signal to another grid of said tube, whereby the output of said tube represents the instantaneous quotient of said division.

3. An electrical circuit for performing division, comprising a multi-grid electron tube; a source of signals which are representative of the divisor; means for producing a signal which is a reciprocal of said divisor signal, said reciprocal signal producing means comprising means for transforming said divisor signal into a frequency modulated signal, a frequency sensitive voltage divider energized by said reciprocal signal producing means, means to obtain from said voltage divider an amplitude modulated signal corresponding to said divosor signal, and means for applying said reciprocal signal to a grid of said tube; whereby the output of said tube represents the instantaneous quotient of said division.

References Cited in the file of this patent

UNITED STATES PATENTS

| | | |
|---|---|---|
| 1,889,083 | Wintringham | Nov. 29, 1932 |
| 2,244,369 | Martin | June 3, 1941 |
| 2,323,698 | Armstrong | July 6, 1943 |
| 2,341,232 | Norton | Feb. 8, 1944 |
| 2,393,717 | Speaker | Jan. 29, 1946 |
| 2,401,404 | Bedford | June 4, 1946 |
| 2,410,489 | Fitch | Nov. 5, 1946 |
| 2,413,913 | Duke | Jan. 7, 1947 |
| 2,460,965 | Adler | Feb. 8, 1949 |
| 2,668,908 | Herman | Feb. 9, 1954 |

FOREIGN PATENTS

| | | |
|---|---|---|
| 121,551 | Australia | June 23, 1949 |

OTHER REFERENCES

Electron Tube Circuits (Seely), page 153, 1950.